United States Patent [19]

Hawkins

[11] Patent Number: 5,034,472

[45] Date of Patent: Jul. 23, 1991

[54] PREPARATION OF FUNCTIONALIZED THERMOPLASTIC POLYMER CONTAINING DICYCLOPENTADIENYL GROUPS IN POLYMER CHAIN WITH DIENOPHILE REAGENT

[75] Inventor: Christopher M. Hawkins, Evansville, Ind.

[73] Assignee: General Electric Company, Mt. Vernon, Ind.

[21] Appl. No.: 333,217

[22] Filed: Apr. 5, 1989

Related U.S. Application Data

[62] Division of Ser. No. 133,861, Dec. 16, 1987, Pat. No. 4,841,001.

[51] Int. Cl.$^5$ .................. C08G 63/62; C08G 63/46

[52] U.S. Cl. ................................ 525/391; 525/397; 525/439; 525/445; 525/447; 525/463; 525/468

[58] Field of Search ............... 525/391, 397, 439, 445, 525/447, 463, 468

[56] References Cited

U.S. PATENT DOCUMENTS 4,841,001  6/1989  Hawkins .......................... 525/468

Primary Examiner—Harold D. Anderson
Attorney, Agent, or Firm—Martin B. Barancik

[57] ABSTRACT

Method for functionalizing a thermoplastic aromatic polycarbonate, copoly(ester carbonate), polyarylate, poly(arylene oxide) or polyarylethersulfone by reacting a precursor polymer that contains dicyclopentadiene with maleic anhydride, and the products so formed.

4 Claims, No Drawings

PREPARATION OF FUNCTIONALIZED THERMOPLASTIC POLYMER CONTAINING DICYCLOPENTADIENYL GROUPS IN POLYMER CHAIN WITH DIENOPHILE REAGENT

This is a division of copending application Ser. No. 133,861 filed Dec. 16, 1987, now U.S. Pat. No. 4,841,001.

The present invention is concerned with the functionalization of polymers. More particularly, it relates to providing thermoplastic polymers with end groups which permit the polymers to form compatible blends with other thermoplastic materials.

BACKGROUND OF THE INVENTION

The use of thermoplastic polymers for many industrial applications is gaining increased acceptance today because of their excellent physical properties. For example, polycarbonates, especially aromatic polycarbonates formed from dihydric phenols, exhibit excellent physical attributes such as tensile strength, impact strength, and thermal stability. However, most polymers are generally deficient in at least one of several properties which curtails their use in certain products. For example, the use of polycarbonates in some applications, e.g., automotive, is limited somewhat because of their poor resistance to various organic solvents and other chemicals. On the other hand, materials such as the polyamides do not generally exhibit the superior physical properties of polycarbonates, but do exhibit excellent chemical resistance. It is thus apparent that a blend of several thermoplastic materials might result in a product possessing the best of each of their individual physical properties.

A particularly promising set of physical properties might result from the combination of the polycarbonates and polyamides discussed above. Blends of polycarbonates and various polyamides have been prepared in the past. For example, Japanese Kokai No. 116541/50 discloses a blend containing 80-95% by weight polycarbonate and 5-20% by weight of nylon 12. Furthermore, Japanese Patent Publication 26936/76 discloses adhesive compositions containing 5-40% by weight of a polycarbonate and 60-95% of a polyamide. Moreover, thermoplastic blends containing a polycarbonate and a polyamide along with a conjugated diene rubber are disclosed in U.S. Pat. No. 4,317,891.

While the polycarbonate/polyamide blends of the prior art may be suitable for some end uses, they generally exhibit serious disadvantages. For example, when molded, they often become severely laminated. Such undesirable lamination is often accompanied by poor impact strength. Furthermore, amine end groups of the polyamide react with carbonate bonds and thereby degrade the polycarbonate portion of the blend, resulting in loss of tensile strength, heat resistance and other desirable characteristics. It is thus readily apparent that the inherent chemical incompatibility between polycarbonates and polyamides results in blends of such materials having properties which are unacceptable for many uses.

Commonly assigned U.S. Pat. No. 4,732,934 describes a method for functionalizing a hydroxy-terminated thermoplastic polycarbonate with a functionalizing agent such as carbonyl-containing diacids followed by reaction with an amine-terminated polyamide resin. The entire content of that application is incorporated by reference.

The advantages accruing from blending two dissimilar polymers, each with its particular advantages, is not restricted to thermoplastic polycarbonates and nylon, but rather applies equally well to other engineering thermoplastics such as the aromatic polycarbonates, polyarylates, poly(arylene oxide)s, and polyarylethersulfones.

The synthesis of 1:1 polyesters of dicyclopentadiene dicarboxylic acid with the bis-(p-hydroxyphenyl)ether and with 2,2-bis-(p-hydroxyphenyl)propane is described by Mirva et al. in Bulletin of The Chemical Society of Japan, Vol. 50, No. 10, pp 2682-2685 (1977).

It is an object of the present invention to provide an improved method for functionalizing a thermoplastic resin having a structure comprising one or more recurring carbonate, ester, ether, or sulfone groups chemically linking hydrocarbon diradicals at least some of which are aromatic diradicals.

It is another object of the present invention to provide a functionalized thermoplastic resin which is capable of chemical reaction with a polyamide.

It is a further object to provide a functionalized bisphenol-A polycarbonate resin that forms a compatible blend with a polyamide such as nylon-6.

These and other objects will become evident to one skilled in the art on reading this entire specification including the appended claims.

BRIEF SUMMARY OF THE INVENTION

It has now been found that aromatic thermoplastic polymers (such as bisphenol-A polycarbonate) that contain dicyclopentadienyl diradicals in the main chain, readily react with a dienophile reagent (such as maleic anhydride) to provide a bisphenol-A polycarbonate resin with anhydride end-groups. Such products may in turn be blended with a different polymer, preferably one such as nylon-6 having free amine groups, to form a polyamidepolycarbonate copolymer.

One embodiment of this invention provides a thermoplastic polymer having recurring aromatic units in the main chain and end groups of Formula I,

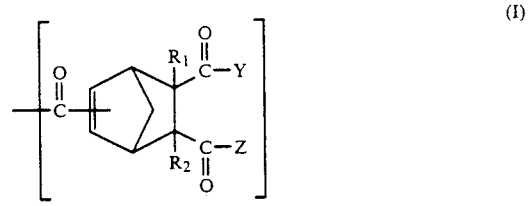

(I)

wherein $R_1$ and $R_2$ are individually selected from the group consisting of hydrogen, alkyl of 1 to 6 carbons, phenyl, bromine and chlorine; and wherein Y and Z are individually selected from the group consisting of hydroxy, alkoxy, aryloxy, halogen and arylamine, and when taken together are an oxygen.

The thermoplastic polymer having recurring aromatic units is preferably selected from the group consisting of aromatic polycarbonates, aromatic copoly(ester carbonate)s, polyarylates, polyarlyene oxides, and polyarylethersulfones. The preferred end group is that wherein both $R_1$ and $R_2$ are both hydrogen and Y and Z taken together are oxygen.

In another embodiment, this invention provides a method for preparing a functionalized thermoplastic polymer selected from the group consisting of aromatic polycarbonates, aromatic copoly(ester carbonate)s, polyarylates, poly(arylene oxide)s and polyarylethersulfones, which method comprises contacting under reaction conditions a precursor thermoplastic aromatic polycarbonate, or aromatic copoly(ester carbonate), or polyarylate, or poly(arylene oxide), or polyarylethersulfone, said precursor having up to 15 mole % dicyclopentadienyl diradicals in the polymer backbone, with the reagent having the formula Ia,

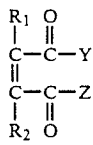  (Ia)

wherein $R_1$, $R_2$, Y and Z are as described above; and recovering said functionalized polymer.

DETAILED DESCRIPTION AND BEST MODE

The method of this invention for functionalizing the precursor aromatic polymer that contains dicyclopentadienyl diradicals is simple. It essentially requires contacting under reaction conditions the polymer and a dienophile reagent, such as maleic anhydride. While not wishing to be bound by theory, it is believed that the dicyclopentadienyl diradicals and/or their monomeric counterparts in the precursor polymer undergo a Diels-Alder type condensation reaction, resulting in the formation of acid anhydride end groups or simple derivatives thereof.

The dienophile reagent (hereinafter referred to as "reagent") useful in the present invention has the formula Ia,

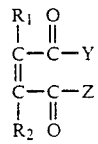  (Ia)

wherein $R_1$ and $R_2$ are individually selected from the group consisting of hydrogen, alkyl of 1 to 6 carbons, phenyl, bromine and chlorine; and wherein Y and Z are individually selected from the group consisting of hydroxy and alkoxy groups, and when taken together are an oxygen. Compounds such as maleic anhydride, dimethyl maleate, diethyl maleate, diphenyl maleate, bromomaleic acid, chloromaleic acid, dimethyl chloromaleate, diethyl chloromaleate, citraconic acid, citraconic anhydride and the dimethyl and diethyl esters thereof, and the like, are examples of suitable reagents.

Because of availability, cost and effectiveness, maleic anhydride is the preferred reagent.

In one embodiment of the method of this invention, contacting with the reagent is conducted with a 1 (one) to 25 wt % solution of the dicyclopentadiene-containing polymer in an aprotic anhydrous solvent for the polymer. The choice of solvent is not critical, and liquids such as chlorobenzene and nitrobenzene may be used. The reagent is usually added in the amount required to convert all the dicyclopentadienyl groups in the polymer to the desired end groups, i.e., in the proportion of 2 moles of reagent per mole of dicyclopentadienyl diradical. The polymer solution and reagent are maintained at a temperature of about 120° C. to about 200° C., for 1 minute to 10 hours, to effect the desired reaction. The functionalized polymer substantially free of dicyclopentadienyl diradicals is recovered by any suitable conventional means known to those skilled in the art.

It is also contemplated to conduct the contacting step by intensive dry mixing of the reagent with the precursor thermoplastic polymer at or above the melting point of the precursor. Temperatures in the range of 190° C. to 250° C. are contemplated, with a mixing time of about 0.5 to 60 minutes.

The precursor aromatic thermoplastic that contains dicyclopentadienyl diradicals may be prepared by any method. One such method is described in copending U.S. patent application Ser. No. 133,857, filed on Dec. 16, 1987 incorporated herein by reference. The method described therein effects incorporation of dicyclopentadiene by including in the conventional polymer-forming mixture a dicyclopentadiene derivative such as the dicarboxylic acid or acid chloride thereof. Other dicyclopentadienyl derivatives that may be used are reactive linear oligomers such as provided by the diester formed from dicyclopentadienyl dicarboxylic acid and bisphenol-A. Such oligomers and their preparations are described in copending application Ser. No. 133,854 filed on Dec. 16, 1987, incorporated herein by reference.

For purposes of the present invention, the amount of dicyclopentadienyl diradical contained in the precursor polymer is not more than about 15 mole percent based on the major repeat unit(s) in the polymer backbone, and preferably in the range of 0.1 to 15 mole percent.

Aside from the requirement for incorporation of the dicyclopentadienyl derivative in the resin-forming mixture as described above, the desired type of precursor thermoplastic resin may be synthesized by methods known to those skilled in the art, said methods per se not constituting part of the the present invention.

The precursor aromatic polycarbonate resins for use in this invention can be prepared by reacting a dihydric phenol with a carbonate-forming compound such as phosgene, a haloformate or a carbonate ester. Generally speaking, such carbonate polymers possess recurring structural units of the formula:

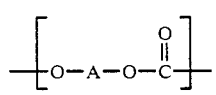  (II)

wherein A is a divalent aromatic radical of the dihydric phenol employed in the polymer producing reaction. Preferably, the carbonate polymers used to provide the precursors for this invention have an intrinsic viscosity (as measured in methylene chloride at 25° C.) ranging from about 0.30 to about 1.7 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are:

2,2-bis(4-hydroxyphenyl)propane;
hydroquinone;
resorcinol;
2,2-bis-(4-hydroxyphenyl)pentane;
2,4'-dihydroxydiphenylmethane;
bis-(2-hydroxyphenyl)methane;

bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxydiphenyl)sulfone;
bis-(3,5-diethyl-4-hydroxyphenyl)sulfone;
2,2-bis-(3,5-dimethyl-4-hydroxyphenyl)propane;
2,4'-dihydroxydiphenyl sulfone;
5'-chloro-2,4'-dihydroxydiphenyl sulfone;
bis-(4-hydroxyphenyl)diphenyl sulfone;
4,4'-dihydroxydiphenyl ether;
4,4'-dihydroxy-3,3'-dichlorodiphenyl ether;
4,4'-dihydroxy-2,5-dimethyldiphenyl ether; and the like.

Other dihydric phenols which are also suitable for use in the preparation of the above polycarbonates are disclosed in U.S. Pat. Nos. 2,999,835; 3,028,365; 3,334,154; and 4,131,575.

These precursor aromatic polycarbonates can be manufactured by known processes, such as, for example and as mentioned above, by reacting a dihydric phenol with a carbonate precursor, such as phosgene, in accordance with methods set forth in the above-cited literature and U.S. Pat. No. 4,018,750 and 4,123,436, or by transesterification processes such as are disclosed in U.S. Pat. No. 3,153,008, as well as other processes known to those skilled in the art.

It is possible to employ two or more different dihydric phenols or a copolymer of a dihydric phenol with a glycol or with a hydroxy or acid terminated polyester or with a dibasic acid in the event a precursor carbonate copolymer or interpolymer rather than a homopolymer is desired for use in the preparation of the functionalized polycarbonate of this invention. Branched polycarbonates such as are described in U.S. Pat. No. 4,001,184, also may be prepared by the method of this invention. In any event, the preferred functionalized aromatic carbonate polymer of this invention is a homopolymer derived from 2,2-bis(4-hydroxyphenyl)propane (bisphenolA).

The precursor copoly(ester carbonate) of this invention may generally be described as polymers comprising recurring carbonate groups,

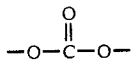

carboxylate groups,

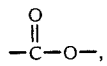

and aromatic carbocyclic groups in the linear polymer chain, in which at least some of the carboxylate groups and at least some of the carbonate groups are bonded directly to ring carbon atoms of the aromatic carboxylic groups. These copoly(ester carbonate) copolymers in general, are prepared by reacting a difunctional carboxylic acid or ester forming derivative, a dihydric phenol and a carbonate precursor.

The dihydric phenols useful in formulating the precursor copoly(ester carbonates) for use herein may be represented by the general formula III,

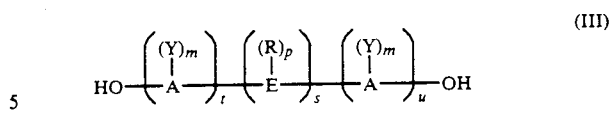

in which A is an aromatic group such as phenylene, biphenylene, naphthylene, anthrylene, etc. E may be an alkylene or alkylidene group such as methylene, ethylene, propylene, propylidene, isopropylidene, butylene, butylidene, isobutylidene, amylene, isoamylene, amylidene, isoamylidine and generally from one to twelve carbon atoms, inclusive, etc. Where E is an alkylene or alkylidene group, it may also consist of two or more alkylene or alkylidene groups, connected by a non-alkylene or non-alkylidene group such as an aromatic linkage, a tertiary amino linkage, an ether linkage, a carbonyl linkage, a silicon-containing linkage, or by a sulfur-containing linkage such as sulfide, sulfoxide, sulfone, etc. In addition, E may be a cycloaliphatic group of 5 to 12 carbon atoms, inclusive (e.g. cyclopentyl, cyclohexyl), or a cycloalkylidene of 5 to 12 carbon atoms inclusive, such as cyclohexylidene, a sulfur containing linkage, such as sulfide, sulfoxide or sulfone; an ether linkage; a carbonyl group; a tertiary nitrogen group, or a silicon containing linkage such as silane or siloxy. Other groups which E may represent will occur to those skilled in the art. R is hydrogen or a monovalent hydrocarbon group such as alkyl of one to eight carbon atoms, inclusive (methyl, ethyl, propyl, etc), aryl (phenyl, naphthyl, etc.), aralkyl (benzyl, ethylphenyl, etc.) or cycloaliphatic of 5 to 12 carbon atoms, inclusive (cyclopentyl, cyclohexyl, etc.). Y may be an inorganic atom such as chlorine, bromine, fluorine, etc.; an organic group such as R above, or an oxy group such as OR, or C=N it being only necessary that Y be inert to and unaffected by the reactants and the reaction conditions. The letter m is any whole number from and including zero through the number of positions on A available for substitution; p is any whole number from and including zero through the number of available positions on E; t is a whole number equal to at least one, S is either zero or one, and u is any whole number including zero.

In the dihydric phenol compound represented by Formula III above, when more than one Y substituent is present, they may be the same or different. The same is true for the R substituent. Where s is zero in Formula III and u is not zero, the aromatic rings are directly joined with no intervening alkylene or other bridge. The positions of the hydroxyl groups and Y on the aromatic nuclear residues A can be varied in the ortho, meta, or para positions and the groupings can be in a vicinal, asymmetrical or symmetrical relationship, where two or more ring carbon atoms of the aromatic hydrocarbon residue are substituted with Y and hydroxyl group.

Examples of dihydric phenol compounds that may be employed in the precursor copoly(ester carbonate) of this invention include:
2,2-bis-(4-hydroxyphenyl)propane (bisphenol-A);
2,4'-dihydroxydiphenylmethane;
bis-(2-hydroxyphenyl)methane;
bis-(4-hydroxyphenyl)methane;
bis-(4-hydroxy-5-nitrophenyl)methane;
bis-(4-hydroxy-2,6-dimethyl-3-methoxyphenyl)methane;
1,1-bis-(4-hydroxyphenyl)ethane;

1,2-bis-(4-hydroxyphenyl)ethane;
1,1-bis-(4-hydroxy-2-chlorophenyl)ethane;
1,1-bis-(2,5-dimethyl-4-hydroxyphenyl)ethane;
1,3-bis-(3-methyl-4-hydroxyphenyl)propane;
2,2-bis-(3-phenyl-4-hydroxyphenyl)propane;
2,2-bis-(3-isopropyl-4-hydroxyphenyl)propane;
2,2-bis-(4-hydroxynaphthyl)propane;
2,2-bis-(4-hydroxyphenyl)pentane;
3,3-bis-(4-hydroxyphenyl)pentane;
2,2-bis-(4-hydroxyphenyl)heptane;
bis-(4-hydroxyphenyl)phenylmethane;
bis-(4-hydroxyphenyl)cyclohexylmethane;
1,2-bis-(4-hydroxyphenyl)-1,2-bis-(phenyl)propane;
2,2-bis-(4-hydroxyphenyl)-1-phenylpropane; and the like.

Also included are dihydroxybenzenes typified by hydroquinone and resorcinol, dihydroxydiphenyls such as 4,4'-dihydroxydiphenyl; 2,2'-dihydroxydiphenyl; 2,4'dihydroxydiphenyl; dihydroxynaphthalenes such as 2,6-dihydroxynaphthalene, etc.

Also useful are dihydric phenols wherein E is a sulfur-containing radical such as the dihydroxy aryl sulfones exemplified by: bis-(4-hydroxyphenyl)sulfone; 2,4'-dihydroxydiphenyl sulfone; 5-chloro-2,4'-dihydroxydiphenyl sulfone; 3-chloro-bis-(4-hydroxyphenyl) sulfone; and 4,4'-dihydroxytriphenyl-disulfone; etc. The preparation of these and other useful sulfones are described in U.S. Pat. No. 2,288,282. Polysulfones as well as substituted sulfones using halogen, nitrogen, alkyl radicals, etc. are also useful.

Dihydroxy aromatic ethers such as those described in U.S. Pat. No. 3,148,172 are useful as the dihydric phenol herein. The dihydroxy aromatic ethers may be prepared as described in U.S. Pat. No. 2,739,171. Illustrative of such compounds are the following:
4.4'-dihydroxydiphenyl ether;
4,4'-dihydroxytriphenyl ether;
the 4,3'-, 4,2'-, 2,2'-, 2,3'-, etc. dihydroxydiphenyl ethers;
4,4'-dihydroxy-2,6-dimethyldiphenyl ether;
4,4'-dihydroxy-2,5-dimethyldiphenyl ether;
4,4'-dihydroxy-3,3'-diisobutyldiphenyl ether;
4,4'-dihydroxy-3,3'-diisopropyldiphenyl ether;
4,4'-dihydroxy-3,3'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
4,4'-dihydroxydinaphthyl ether;
4,4'-dihydroxy-3,3'-dichlorodinaphthyl ether;
2,4-dihydroxytetraphenyl ether;
4,4'-dihydroxypentaphenyl ether;
4,4'-dihydroxy-2,6-dimethoxydiphenyl ether;
4,4'-dihydroxy-2,5-diethoxydiphenyl ether, etc.

Mixtures of the dihydric phenols can also be employed and where dihydric phenol is mentioned herein, mixtures of such materials are considered to be included.

In general, any difunctional carboxylic acid or its reactive derivative such as the acid halide conventionally used in the preparation of polyesters may be used for the preparation of precursor poly(ester carbonate) compositions of the present invention. In general, the carboxylic acids which may be used include the aliphatic carboxylic acids, aliphatic aromatic carboxylic acids, or aromatic carboxylic acids. The aromatic dicarboxylic acids or their reactive derivatives such as the aromatic diacid halides are preferred as they produce the aromatic copoly(ester carbonates) which are most useful, from the standpoint of physical properties, in the practice of the instant invention.

These carboxylic acids may be represented by the general formula IV, $$R^2 \!\!-\!\!(\!R^1\!)_q\!\!-\!\!COOH \tag{IV}$$

wherein $R^1$ represents an alkylene, alkylidene or cycloaliphatic group in the same manner as set out above for E in Formula III; an alkylene, alkylidene or cycloaliphatic group containing ethylenic unsaturation; an aromatic radical such as phenylene, naphthylene, biphenylene, substituted phenylene, etc.; two or more aromatic groups connected through non-aromatic linkages such as those defined by E in Formula III; or a divalent aliphatic aromatic hydrocarbon radical such as an aralkyl or alkaryl radical. $R^2$ is either a carboxyl or a hydroxyl group. The letter q represents the integer one where $R^2$ is a hydroxyl group and either zero or one where $R^2$ is a carboxyl group. Thus the difunctional carboxylic acid will either be a monohydroxy monocarboxylic acid or a dicarboxylic acid. For purposes of the present invention the aromatic dicarboxylic acids or their reactive derivatives such as, for example, the acid halides, are preferred. Thus in these preferred aromatic dicarboxylic acids, as represented by Formula III, $R^2$ is a carboxyl group and $R^1$ is an aromatic radical such as phenylene, biphenylene, naphthylene, substituted phenylene, etc., two or more aromatic groups connected through non-aromatic linkages; or a divalent aliphatic aromatic radical. Some nonlimiting examples of suitable preferred aromatic dicarboxylic acids which may be used in preparing the copolyestercarbonate resins of the instant invention include phthalic acid, isophthalic acid, terephthalic acid, homophthalic acid, o-, m-, and p-phenylenediacetic acid, the polynuclear aromatic acids such as diphenic acid, and 1,4-naphthalic acid. The aromatics may be substituted in the same manner as the Formula II aromatics are substituted.

These acids may be used individually or as mixtures of two or more different acids.

The carbonate-forming reactant may be either a carbonyl halide, a carbonate ester, or a haloformate. The carbonyl halides which can be employed herein are carbonyl chlorides or carbonyl bromide. Typical of the carbonate esters which may be employed herein are diphenyl carbonate, di(halophenyl)carbonates such as di(chlorophenyl)carbonate, di(bromophenyl)carbonate, di(trichlorophenyl)carbonate, di(tribromophenyl)carbonate, etc., (dialkylphenyl)carbonate, such as di(tolyl)-carbonate, etc., di(naphthyl)carbonate, di(chloronaphthyl)carbonate, phenyltolyl carbonate, chloronaphthyl chlorophenyl carbonate, and the like. The haloformates suitable for use herein include bishaloformates of dihydric phenols such as bischloroformates of hydroquinone, etc. or glycols such as bishaloformates of ethylene glycol, neopentyl glycol, polyethylene glycol, etc. While other carbonate precursors will occur to those skilled in the art, carbonyl chloride, also known as phosgene is preferred.

The preparation of precursor copoly(ester carbonate) compositions of the present invention may be conducted by methods described in U.S. Pat. Nos. 3,030,331; 3,169,121; 3,207,814; 4,194,038 and 4,156,069.

The functionalized copoly(ester carbonates) which are preferred in the practice of the present invention include the aromatic copoly(ester carbonates) derived from dihydric phenols, aromatic dicarboxylic acids or their reactive ester forming derivatives such as the aromatic diacid halides, and phosgene. A particularly useful class of aromatic copoly(ester carbonate)s is that derived from bisphenol-A, isophthalic acid, terephthalic acid, or a mixture of isophthalic acid and terephthalic acid, or the reactive derivatives of these acids such as terephthaloyl dichloride, isophthaloyl dichloride, or a mixture of isophthaloyl dichloride and terephthaloyl dichloride, and phosgene. The molar proportion of ester units in the copolyestercarbonate is generally from about 25 to 90 mole percent and preferably about 35 to 80 mole percent. The molar range of terephthalate units, the remainder of the copolymer ester units preferably comprising isophthalate units is generally from about 2 to 90 percent, and preferably from about 5 to about 25 percent.

The polyarylate precursors which are suitable for use in this invention are derived from a dihydric phenol and at least one aromatic dicarboxylic acid and have a reduced viscosity of from about 0.4 to greater than about 1.0, preferably from about 0.6 to about 0.8 dl/gm, as measured in chloroform (0.5 g/100 ml chloroform) or other suitable solvent at 25° C.

A particularly desirable dihydric phenol is of the following Formula v:

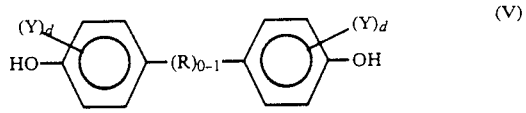

wherein Y is independently selected from, hydrogen, alkyl groups of 1 to 4 carbon atoms, chlorine or bromine, each d, independently, has a value of from 0 to 4, inclusive, and R is a divalent saturated or unsaturated aliphatic hydrocarbon radical, particularly an alkylene or alkylidene radical having from 1 to 6 carbon atoms, or a cycloalkylidene or cycloalkylene radicals having up to and including 9 carbon atoms, O, CO, $SO_2$ or S. The dihydric phenols may be used individually or in combination.

The dihydric phenols that may be used in this invention include the following:
2,2-bis-(4-hydroxyphenyl)propane;
bis-(2-hydroxyphenyl)methane;
bis-(4-hydroxyphenly)methane;
bis-(4-hydroxy-2,6-dimethyl-3-methoxypeheny)methane;
1,1-bis-(4-hydroxyphenyl)ethane;
1,2-bis-(4-hydroxyphenyl)ethane;
1,1-bis-(4-hydroxy-2-chlorophenyl)ethane;
1,3-bis-(3-methyl-4-hydroxyphenyl)ethane;
1,3-bis-(3-methyl-4-hydroxyphenyl)propane;
2,2-bis-(3-phenyl-4-hydroxyphenyl)propane;
2,2-bis-(3-isopropyl-4-hydroxyphenyl)propane;
2,2-bis-(2-isopropyl)-4-hydroxyphenyl)propane;
2,2-bis-(4-hydroxyphenyl)pentane;
3,3-bis-(4-hydroxyphenyl)pentane;
2,2-bis-(4-hydroxyphenyl)heptane;
1,2-bis-(4-hydroxyphenyl)1,2-bis-(phenyl)propane;
4,4'-(dihydroxyphenyl)ether;
4,4'-(dihydroxyphenyl)sulfide;
4,4'-(dihydroxyphenyl)sulfone;
4,4'-(dihydroxyphenyl)sulfoxide;
4,4'-(dihydroxybenzophenone), and naphthalene dios.

The aromatic dicarboxlic acids that may be used include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers, and the like. Acetoxybenzoic acid can also be used. Preferably, mixtures of isophthalic and terephthalic acids are used. The isophthalic acid terephthalic acid ratio in the mixture is about 0:100 to about 100:0, while the most preferred acid ratio is about 75:25 to about 50:50. Also, from about 0.5 to about 20 percent of aliphatic diacids containing from 2 to about 10 carbon atoms, such as adipic acid, sebacic acid, and the like may be additionally used in the polymerization reaction.

The polyarylate precursors useful in the present invention can be prepared by any of the well known prior art polyester forming reactions, such as the reaction of the acid chlorides of the aromatic dicarboxylic acids with the dihydric phenols; the reaction of the diaryl esters of the aromatic dicarboxylic acids with the dihydric phenols; or the reaction of the aromatic diacids with diester derivatives of the dihydric phenol. These processes are described in, for example, U.S. Pat. Nos. 3,317,464; 3,948,856; 3,780,148; 3,824,214; and 3,133,898, all incorporated herein by reference.

The polyarylate precursors are preferably prepared by the process as set forth in U.S. Pat. No. 4,321,355, incorporated herein by reference. This process comprises the following steps:

(a) reacting an acid anhydride derived from an acid containing from 2 to 8 carbon atoms with at least one dihydric phenol to form the corresponding diester; and, (b) reacting said diesters with at least one aromatic dicarboxylic acid at a temperature sufficient to form the polyarylate, wherein the improvement comprises removing residual acid anhydride after formation of the dihydric phenol diester so that its concentration is less than about 1500 parts per million.

The acid anhydride suitable is derived from an acid containing from 2 to 8 carbon atoms. The preferred acid anhydride is acetic anhydride.

The dihydride phenol is described above.

Generally, the dihydric phenol reacts with the acid anhydride under conventional esterification conditions to form the dihydric phenol diester. The reaction may take place in the presence or absence of a solvent. Additionally, the reaction may be conducted in the presence of a conventional esterification catalyst or in the absence thereof.

U.S. Pat. No. 4,576,842 to Hartsing, column 12, line 39 to column 14, line 5 is incorporated herein by reference.

The precursor thermoplastic poly(arylene oxides) useful in the present invention have the general structure:

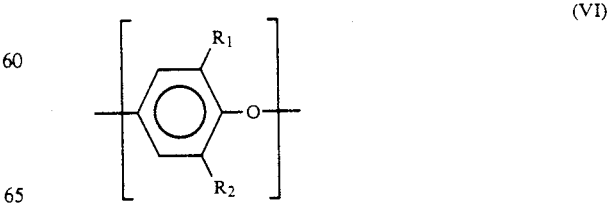

wherein either one or both of $R_1$ and $R_2$ may be hydrogen, methyl, methoxy, phenyl, or chlorine. The particularly preferred poly(arylene oxide) is poly(2,6-dimethyl-1,4-phenylene oxide) DMPPO. This precursor polymer and many other structures may be prepared by oxidative coupling of 2,6-disubstituted phenol in the presence of copper halide and one or more aliphatic amines or pyridine. Modified DMPPO may also be prepared from 4-bromo-2,6-dimethylphenol in the presence of potassium hydroxide with a free-radical initiator. Kirk-Othmer's *Encyclopedia of Chemical Technology*, 3rd Ed., Vol. 18, pp 595-605 and pertinent references on pp 613-615 are incorporated herein by reference for further description of the manufacture and properties of the poly(arylene oxides).

Polyarylethersulfone precursors useful in this invention may be prepared by incorporation of a suitable dicyclopentadiene derivative in the synthesis of conventional polyarylethersulfone materials. Such materials are well known in the art and are amply described in the literature including, inter alia, U.S. Pat. No. 3,642,946; Modern Plastics Encyclopedia, 1977-78, pp. 108, 110-112; Kirk-Othmer, Encyclopedia of Chemical Technology, Second Edition, Vol. 16, pp. 272-281 (1968); and Handbook of Plastics and Elastomers, C. A. Harper, ed., McGraw-Hill, Inc. 1975, pp. 1-69 and 95-96, and in U.S. Pat. 4,576,842 to Hartsing et al., columns 3-7, all of which are incorporated herein by reference.

The precursor polyarylethersulfones useful in the present invention contain at least one recurring structural unit represented by the general Formula VII:

$$-Ar-SO_2-Ar-O-Ar'-A-Ar'-O- \quad (VII)$$

wherein Ar and Ar' are independently selected from the group consisting of phenylene, alkyl-, alkoxy-, halogen-, and nitro-substituted phenylene; and A is selected from the group consisting of carbon-to-carbon bonds, alkylidene, cycloalkylidene, carbonyl sulfoxide, sulfur, sulfone, azo, imino, and oxygen.

The polysulfones of Formula VII are preferably derived from dichlorodiphenyl sulfones reacted with bisphenols. A second group of sulfones represented by Formula VII is where Ar and Ar' are phenylene and A is sulfone. A third major group of polysulfones represented by Formula VII are those wherein Ar and Ar' are phenylene and A is oxygen, i.e., the polyarylethersulfones. When Ar is phenylene, it should preferably be either meta or para and may be substituted in the ring positions with alkyl groups such as methyl, ethyl, and propyl. The alkoxy groups may be groups such as methoxy and propoxy. Particularly useful polysulfones are those derived from disulfonyl chlorides such as 4,4-biphenyldisulfonyl chloride reacted with diphenyl ether.

The precursor polysulfones of the present invention may be prepared in a variety of ways such as by nucleophilic aromatic substitution which is described in the Journal of Polymer Science, Part A 15, 2375-98 (1967) or by condensation procedures which are described in British Patent No. 1,060,546, both of which are incorporated herein by reference.

The precursor polyarylethersulfones contain at least the following recurring structural units:

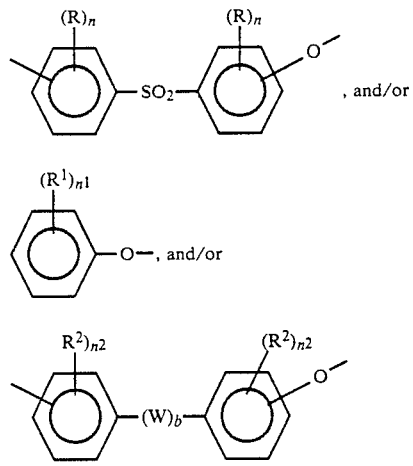

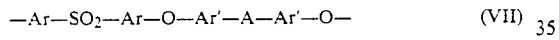

wherein R, $R^1$ and $R^2$ are independently selected from $C_1-C_6$ alkyl, $C_4-C_8$ cycloalkyl, and halogen radicals; W is a $C_2-C_8$ alkylene, a $C_1-C_8$ alkylidene, a cycloalkylene or cycloalkylidene radical containing from 4 to about 16 ring carbon atoms; b is either zero or one; and n, $n^1$ and $n^2$ are independently selected from integers having a value of from 0 to 4 inclusive.

A particularly useful precursor polyarylethersulfone is one which contains at least one recurring structural unit represented by Formula VIII;

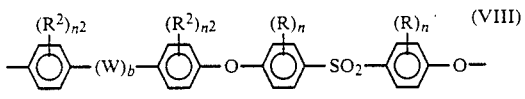

wherein $R^2$, R, W, b, n and $n^2$ are as defined hereinafore. Particularly useful precursor polyarylethersulfones sulfones of Formula VIII are those wherein b is one and W is an alkylidene radical, preferably the isopropyildene radical. Of these types of polyarylethersulfones those wherein n and $n^2$ are zero are particularly useful. The preparation of these polyarylethersulfones, as well as the precursor resins themselves, may be conducted as described in U.S. Pat. No. 4,503,168, incorporated herein by reference.

The functionalized thermoplastic polymer of this invention may be blended with a second thermoplastic polymer. "Blend" as used herein is meant to define a physical combination of two or more materials which may additionally involve chemical reactions between the two materials. The particular thermoplastic polymer to be blended with the functionalized polymer will of course depend on the end use of the blended product.

When molded parts formed with the blended product must exhibit a high degree of chemical resistance, particularly useful polymers to be blended with the functionalized polymer are the polyamides, which are well known in the art. Detailed descriptions of many of them may be found in the Kirk-Othmer Encyclopedia of Chemical Technology, Third Edition. Selection of particular polyamides for use in the composition of the present invention of course depends on the contemplated use of the product. For example, amorphous polyamides, i.e., those not having any molecular crystal structure, may enhance dimensional stability in thermoplastic blends because of their tendency not to absorb as much moisture as crystalline polyamides, and are therefore contemplated as especially useful as a component in compositions for molded parts which will be exposed to a moisture-containing enviornment. Moreover, blended products of the present invention containing amorphous polyamides are expected to possess excellent barrier properties, i.e., to exhibit very low permeability to the passage of gases such as oxygen, nitrogen, and carbon dioxide, thereby making them excellent materials for beverage containers.

Crystalline polyamides are also contemplated as useful in molded products which require a high level of tensile strength, e.g., automobile parts.

The formation of a compatible blend of the polyamide and the functionalized polymer of the present invention requires a sufficient degree of amine end group termination on the polyamide prior to blending. The particular level of amine and group concentration will depend in part upon physical properties desired for the product. For example, higher amine end group concentrations generally are expected to result in greater impact strength for the material. A preferred amine end group concentration will range from about 20 gram milliequivalents amine per kilogram polyamide (g.meq/kg) to 120 g.meq/kg. Amine end group concentrations above this range may cause some degradation of the functionalized polymer, as evidenced by a decrease in molecular weight, but it may not necessarily cause a significant decrease in the physical properties of the blend. Copolymer formation between the functionalized carbonate polymer and the polyamide may be less likely to occur if the amine end group concentration of the polyamide is less than 20 g meq/kg. Specific examples of polyamides suitable for blending include those commonly referred to as nylon 6; nylon 4; nylon 6/9; nylon 6/6; and nylon 6/12, as well as those derived from terephthalic acid and trimethylhexamethylene diamine; those derived from adipic acid, azelaic acid and 2,2-bis-(4-aminocyclohexyl)propane; and those derived from terephthalic acid and isophthalic acid with 4,4'-diamino-dicyclohexylmethane or meta-xylylenediamine.

Specific examples of amorphous polyamides suitable for the present invention include those prepared from a mixture of a diamine such as hexamethylene diamine and isophthalic and/or terephthalic acids. SELAR PA, a product of E. I. Dupont Company, is exemplary of this type of amorphous polyamide.

Preparation of blends may be accomplished by any conventional blending technique such as, for example, dry blending, melt blending, solution blending and the like. Melt blending may be accomplished in a conventional extruder, from which the admixture may be molded into a part of specific dimensions or further extruded to a film or sheet.

EXAMPLES

The examples which follow are given for illustrative purposes and are not intended to limit the scope of this invention, which scope is determined by this entire specification including the appended claims.

All references in the specification and examples to "Intrinsic Viscosity" (IV) refer to the value measured at 30° C. in dichloromethane, unless explicitly stated to be otherwise.

All references in the specification and examples to "melt viscosity" refer to the melt viscosity as measured by the Kasha Index (KI). The KI of a resin is a measurement of its melt viscosity and is obtained in the following manner: 7 grams of resin, dried a minimum of 90 minutes at 125° C., are added to a modified TiniusOlsen Model T3 melt indexer; the temperature in the indexer is maintained at 300° C. and the resin is heated at this temperature for 6 or 12 minutes. After 6 or 12 minutes, the resin is forced through a 0.1048 cm radius orifice using a plunger of radius 0.4737 cm and an applied force of 78.7N. The time required for the plunger to travel two inches is measured in centiseconds; that required time is reported as the KI.

EXAMPLE 1

This example illustrates the preparation of a precursor aromatic polycarbonate having dicyclopentadiene dicarboxylate units in the chain.

A 2 L four neck flask was fitted with a mechanical stirrer, a pH probe, a gas inlet tube and a Claisen adapter to which was attached a dry ice condenser and an aqueous caustic inlet tube. To the flask was added methylene chloride (680 ml), $H_2O$ (560 ml), bisphenol-A (51.3 g, 0.225 mole), triethyl amine (1.4 ml, 0.01 mole), phenol (0.47 g, 0.005 mole), dicyclopentadiene dicarboxylic acid (DCCA) (5.5 g, 0.025 mole). This mixture was phosgenated at 1 g/min at pH 5 for 5 minutes. The pH was raised 10 and phosgenation continued for a total of 30 minutes. After a 10 minute nitrogen purge to remove excess phosgene, the organic phase was washed with dilute HCl and water to obtain a pH 7 organic phase. After drying with $MgSO_4$ the solution was precipitated into 1500 ml MeOH and dried in a 125 ° C. oven overnight. The intrinsic viscosity in dichloromethane was 0.432. Infrared analysis of the resulting polymer shows that it contained 2.8% dicyclopentadiene dicarboxylate.

EXAMPLE 2

This example illustrates the preparation of a precursor copoly(ester carbonate) having dicyclopentadiene dicarboxylate units in the chain.

A 1 L four neck flask was fitted with a mechanical stirrer, a pH probe, a gas inlet tube and a Claisen adapter to which was attached a dry ice condenser and an aqueous caustic inlet tube. To the flask was added methylene chloride (325 ml), H2O (275 ml), bisphenol-A (40.0 g, 0.175 mole), triethyl amine (0.75 ml, 0.005 mole), para-tert-butyl phenol (0.79 g, 0.006 mole), and dicyclopentadiene diacid chloride. This mixture was stirred at pH 9 for 5 minutes. Iso/Tere-phthaloyl chloride (25.9 g, 0.128 mole, 93/7 iso:tere ratio) dissolved into 50 ml methylene chloride and added to the 1 L flask over 6 minutes with pH controlled at 9.0-9.5. Phosgene (10.0 g, 0.1 mole) was then added a 1 g/min for 10 minutes with pH controlled at 10. After a 10 minute nitrogen purge to remove excess phosgene, the organic phase was washed with 1% HCl followed by water washes to obtain a pH 7 organic phase. After drying with $MgSO_4$ the solution was precipitated into 1500 mL MeOH and dried in a 125 ° C. oven overnight. The intrinisc viscosity in dichloromethane was 0.481.

EXAMPLE 3

A 100 mL round bottom flask was charged with the resin described in Example 1 (0.70 g), maleic anhydride (0.35 g), and chlorobenzene (50 mL). The resulting solution was refluxed under Argon for 5 hours. After removal of the chlorobenzene in vacuo, the solid was redissolved in dichloromethane (50 mL) and precipitated into 500 mL MeOH and filtered. The analysis of this resin and of a control subjected to the same procedure but without maleic anhydride are given in Table II.

TABLE II

| Sample | Anhydride Endcapped | Control |
|---|---|---|
| maleic anhydride (g) | 0.35 | 0.00 |
| $M_w$ (G.P.) | 11900 | 18100 |
| $M_n$ (G.P.) | 4800 | 6300 |
| IV | .294 | .418 |

Infrared Spectroscopy of the Anhydride Endcapped Resin shows a peak at 1860 cm$^{-1}$ which is characteristic of an anhydride.

EXAMPLE 4

A 100 mL round bottom flask was charged with the resin described in Example 2 (0.70 g), maleic anhydride (0.35 g), and chlorobenzene (50 mL). The resulting solution was refluxed under Argon for 5 hours. After removal of the chlorobenzene in vacuo, the solid was redissolved in dichloromethane (50 mL) and precipitated into 500 mL methanol and filtered. The analysis of this resin and of a control subjected to the same procedure but without maleic anhydride are given in Table III.

TABLE III

| Sample | Anhydride Endcapped | Control |
|---|---|---|
| maleic anhydride (g) | 0.35 | 0.00 |
| MW (GPC) | 16400 | 23400 |
| MN (GPC) | 7900 | 10700 |
| IV | .352 | .420 |

EXAMPLE 5

Examples 5 and 6 illustrate the use of reactive oligomers to incorporate the dicyclopentadienyl moiety in the main chain. See "White, D. M. and Loucks, G. R., ACS Symposium series 155N 0097-6156; 282" edited by Harris, F. W. and Spinelli, H. J., 1985, incorporated by reference for background.

Polyphenylene oxide containing the dicyclopentadienyl moiety can be prepared in the following manner. A jacketed blender may be equipped with a nitrogen inlet, thermocouple and septum port and charged with a suitable solvent and the polymer resulting from reaction of oligomers of poly(2,6-dimethyl-1,4-phenylene oxide) and 3,3',5,5'-tertramethyl-4,4'-diphenoquinone. Water at the desired reaction temperature will be circulated through the blender jacket. A quartenary ammonium halide will then be added followed by aqueous sodium hydroxide. After high speed mixing for several minutes, dicyclopentadiene diacid chloride will be added in one portion. After maintenance of high shear conditions for several minutes, the reaction mixture will be diluted with toluene, acidified and precipitated with methanol. The dicyclopentadienyl-containing polyphenylene ether will be recovered by filtration.

EXAMPLE 6

Polyarylethersulfones containing the dicyclopentadienyl moiety can be prepared as in Example 9 with oligomers of polyarylethersulfone used instead of the oligomer described in Example 12.

EXAMPLE 7

This example illustrates the preparation of polyarylate resins incorporating the dicyclopentadienyl diradicals.

A solution of bisphenol-A and sodium hydroxide in water is prepared in a blender. A small quantity of a surface reactive reagent is added. A second solution of isophthaloyl chloride terephthaloyl chloride and dicyclopentadiene diacid chloride in chloroform is rapidly added to the first solution which is blended very rapidly. After stirring for several minutes the blending is stopped. The mixture is poured into acetone to coagulate the polymer and extract the solvents. The polymer is filtered and washed with acetone and with water. After drying in a vacuum oven the dicyclopentadienyl-containing polyarylate polymer is recovered.

What is claimed is:

1. A method for preparing a functionalized thermoplastic polymer selected from the group consisting of aromatic polycarbonates, aromatic copoly(ester carbonate)s, polyarylates, poly(arylene oxide)s and aromatic polyethersulfones, which method comprises contacting under reaction conditions a precursor thermoplastic aromatic polycarbonate, or aromatic copoly(ester carbonate), or polyarylate, or poly(arylene oxide), or polyarylethersulfone, said precursor having up to 15 mole % dicyclopentadienyl diradicals in the polymer backbone, with the reagent

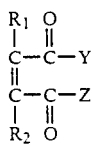

wherein R1 and R2 are individually selected from the group consisting of hydrogen, phenyl, and alkyl radical having 1 to 6 carbon atoms, an alkyl substituted phenyl radical having 1 to 14 carbon atoms, chlorine, bromine, an alkoxy radical having 1 to 6 carbon atoms, and cyano; and wherein Y and Z are individually selected from the group consisting of hydroxy, alkoxy, phenoxy and arylamine, and when taken together are an oxygen; and recovering said functionalized polymer.

2. The method described in claim 1 wherein the step of contacting said precursor thermoplastic with reagent is conducted in the presence of a solvent for said precursor thermoplastic, and wherein said reaction conditions include a temperature of about 120° C. to about 200° C., and a reaction time of about 1 minute to about 10 hours.

3. The method described in claim 2 wherein said precursor thermoplastic resin is an aromatic polycarbonate of bisphenol-A containing said dicyclopentadienyl diradicals, said reagent is maleic anhydride, and said functionalized recovered polymer is a polycarbonate of bisphenol-A with anhydride end groups.

4. The method described in claim 2 wherein said precursor thermoplastic resin is a bisphenol-A copoly(ester carbonate) containing said dicyclopentadienyl diradicals, said reagent is maleic anhydride, and said functionalized recovered polymer is a bisphenol-A copoly(ester carbonate) with anhydride end groups.

* * * * *

UNITED STATES PATENT AND TRADEMARK OFFICE
CERTIFICATE OF CORRECTION

PATENT NO. : 5,034,472

DATED : July 23, 1991

INVENTOR(S) : Christopher Michael Hawkins

It is certified that error appears in the above-identified patent and that said Letters Patent is hereby corrected as shown below:

Column 1
Line 48
Insert "copolymer" after "rubber"

Signed and Sealed this

Fifth Day of January, 1993

Attest:

DOUGLAS B. COMER

Attesting Officer

Acting Commissioner of Patents and Trademarks